United States Patent
Eto et al.

(10) Patent No.: US 8,246,500 B2
(45) Date of Patent: Aug. 21, 2012

(54) VEHICLE HYBRID DRIVING APPARATUS

(75) Inventors: Shingo Eto, Toyota (JP); Koichi Miyamoto, Nagoya (JP); Toshihiko Kamiya, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 267 days.

(21) Appl. No.: 12/591,349

(22) Filed: Nov. 17, 2009

(65) Prior Publication Data

US 2010/0130321 A1    May 27, 2010

(30) Foreign Application Priority Data

Nov. 21, 2008   (JP) .................................. 2008-297632

(51) Int. Cl.
*F16H 3/72*   (2006.01)

(52) U.S. Cl. ............................. 475/5; 475/284; 475/323

(58) Field of Classification Search .............. 475/5, 234, 475/323

See application file for complete search history.

(56) References Cited

U.S. PATENT DOCUMENTS 7,244,208 B2 * 7/2007 Bauknecht et al. ................ 475/5

FOREIGN PATENT DOCUMENTS

| JP | A-05-229350 | 9/1993 |
| JP | A-06-169504 | 6/1994 |
| JP | A-2000-092612 | 3/2000 |
| JP | A-2003-034152 | 2/2003 |
| JP | B2-3586225 | 11/2004 |

OTHER PUBLICATIONS

Japanese Office Action issued in Application No. 2008-297632; Dated Jul. 22, 2010 (With Translation).
Chinese Patent Office, Office Action mailed Dec. 20, 2011 in Chinese Patent Application No. 200910224793.4 w/English-language Translation.

* cited by examiner

*Primary Examiner* — David D Le
*Assistant Examiner* — Derek D Knight
(74) *Attorney, Agent, or Firm* — Oliff & Berridge, PLC

(57) ABSTRACT

A vehicle hybrid driving apparatus that has an engine and an electric motor as drive power sources includes: a hydraulic pressure generation mechanism that generates hydraulic pressure using drive force from the engine; and a planetary gear ratio shift device that has three rotating elements: a first rotating element, a second rotating element, and a third rotating element. The first rotating element is linked to the electric motor so that power transmission therebetween is possible, and is also linked to the engine via a clutch so that power transmission therebetween is possible. The second rotating element is selectively linked to a stationary member via a brake. The third rotating element is linked to an output shaft so that power transmission therebetween is possible. The brake connects the second rotating element and the stationary member when the hydraulic pressure from the hydraulic pressure generation mechanism is not supplied.

8 Claims, 6 Drawing Sheets

FIG.5

|  | C1 | C2 | C3 | C4 | B1 | B2 |
|---|---|---|---|---|---|---|
| P |  |  |  |  |  |  |
| Rev1 |  |  | ○ |  |  | ○ |
| Rev2 |  |  |  | ○ |  | ○ |
| N |  |  |  |  |  |  |
| 1st | ○ |  |  |  |  | ○ |
| 2nd | ○ |  |  |  | ○ |  |
| 3rd | ○ |  | ○ |  |  |  |
| 4th | ○ |  |  | ○ |  |  |
| 5th | ○ | ○ |  |  |  |  |
| 6th |  | ○ |  | ○ |  |  |
| 7th |  | ○ | ○ |  |  |  |
| 8th |  | ○ |  |  | ○ |  |
| ECO |  |  |  |  |  | ○ |
| REGENERATION |  |  |  |  |  | ○ |

|  | C1 | C2 | C3 | B1 | B2 |
|---|---|---|---|---|---|
| P |  |  |  |  |  |
| Rev |  |  | O |  | O |
| N |  |  |  |  |  |
| 1st | O |  |  |  | O |
| 2nd | O |  |  | O |  |
| 3rd | O |  | O |  |  |
| 4th | O | O |  |  |  |
| 5th |  | O | O |  |  |
| 6th |  | O |  | O |  |
| ECO |  |  |  |  | O |
| REGENERATION |  |  |  |  | O |

VEHICLE HYBRID DRIVING APPARATUS

INCORPORATION BY REFERENCE

The disclosure of Japanese Patent Application No. 2008-297632 filed on Nov. 21, 2008, including the specification, drawings and abstract is incorporated herein by reference in its entirety.

BACKGROUND OF THE INVENTION

1. Field of Invention

The invention relates to a vehicle hybrid driving apparatus that has an engine and an electric motor as drive power sources, and particularly concerns size reduction of the power transmission device, and improvement in the fuel economy thereof.

2. Description of Related Art

There is known a driving apparatus for a hybrid vehicle whose drive power sources are an engine that is an internal combustion engine such as a gasoline engine, a diesel engine, etc., and an electric motor that is driven by electric energy. An example of such an apparatus is a hybrid driving apparatus (power transmission apparatus) described in Japanese Patent Application Publication No. 6-169504 (JP-A-6-169504). In the hybrid driving apparatus described in the publication No. 6-169504 (JP-A-6-169504), an output of a torque converter (fluid transmission device) linked to an engine (internal combustion engine) is linked to an intermediate shaft via an input clutch, and an electric motor is linked to the intermediate shaft so that power can be transmitted, and an input shaft of an automatic transmission is also linked to the intermediate shaft. During an engine mode, the input clutch is engaged, so that power of the engine is transmitted to driving wheels via the torque converter and the automatic transmission. During an electric motor mode, the input clutch is released, so that output of the electric motor is transmitted to the driving wheels via the automatic transmission. Due to the foregoing construction, during the engine mode, since power of the engine is transmitted via the torque converter, smooth starting and acceleration of the vehicle is maintained. Besides, during the electric motor mode, since power of the electric motor is transmitted without the intervention of the torque converter, the power loss by the torque converter is eliminated, and therefore relatively long cruising distance can be achieved.

However, in the hybrid driving apparatus (power transmission apparatus) described in the publication No. 6-169504 (JP-A-6-169504), even during the electric motor-driven travel, the automatic transmission sometimes needs supply of hydraulic pressure, and therefore the engine is operated at a certain rotation speed, with the input clutch being in the released state, in order to drive a mechanical type hydraulic pressure pump that acts together with the driving of the engine. Therefore, since the engine is driven even during the electric motor-driven travel, the fuel economy declines. To overcome this problem, the foregoing publication indicates that an electric oil pump is provided, and during the electric motor-driven travel, the electric oil pump is driven and the engine is stopped. However, this has a problem of rise in the manufacturing cost; for example, it becomes necessary to provide a control device that carries out a control of switching the on and off-states of the electric oil pump and the electric oil pump. Besides, there occurs another problem of size increase of the apparatus due to the mounting of the electric oil pump. Furthermore, there arises a need to improve the reliability of the electric oil pump by, for example, providing a fail-safe mechanism in consideration of a failure of the electric oil pump.

To overcome the foregoing problems and the like, it is conceivable to adopt a method in which, to move the vehicle by the drive torque of an electric motor, the electric motor is linked directly to an output shaft of the automatic transmission, as disclosed in Japanese Patent Application Publication No. 5-229350 (JP-A-5-229350). In the construction described in the publication No. 5-229350 (JP-A-5-229350), since the drive torque of the electric motor is transmitted to the driving wheels without intervention of the automatic transmission, it is not necessary to generate hydraulic pressure as mentioned above during the electric motor-driven travel. Thus, this construction eliminates the need to provide an electric oil pump.

However, in the construction described in the publication No. 5-229350, since the automatic transmission is not operated during the electric motor-driven travel, it is impossible to utilize the torque amplification effect of the automatic transmission during the motor-driven mode. Therefore, since the drive torque required during the electric motor-driven travel needs to be generated directly by the electric motor, the electric motor needs to be capable of generating large torque. Since the size of the electric motor and the magnitude of drive torque that the electric motor can generate are generally in a proportional relation, the foregoing technology of the publication No. 5-229350 has a problem of increasing the size of the electric motor and therefore increasing the size of the hybrid driving apparatus.

SUMMARY OF THE INVENTION

The invention provides a vehicle hybrid driving apparatus that has an engine and an electric motor as drive power sources, and that is able to achieve reduction of the apparatus size and improvement in fuel economy.

A first aspect of the invention relates to a vehicle hybrid driving apparatus that has an engine and an electric motor as drive power sources. The hybrid driving apparatus includes: a hydraulic pressure generation mechanism that generates hydraulic pressure by using drive force from the engine; and a planetary gear ratio shift device that has three rotating elements that are a first rotating element, a second rotating element, and a third rotating element. In the apparatus, the first rotating element is linked to the electric motor so that power transmission between the first rotating element and the electric motor is possible, and is linked to the engine via a clutch so that power transmission between the first rotating element and the engine is possible. The second rotating element is selectively linked to a stationary member via a brake, and the third rotating element is linked to an output shaft so that power transmission between the third rotating element and the output shaft is possible. The brake connects the second rotating element and the stationary member when hydraulic pressure from the hydraulic pressure generation mechanism is not supplied.

According to the vehicle hybrid driving apparatus in accordance with the first aspect of the invention, during the engine-driven travel, the clutch is engaged, so that the engine and the first rotating element are connected, and therefore drive force from the engine is output from the third rotating element. On the other hand, during the motor-driven travel, the engine is stopped, and therefore the hydraulic pressure generation mechanism does not operate, so that a state of no supply of hydraulic pressure is entered. However, the brake connects the second rotating element and the stationary member during the time of no supply of hydraulic pressure. Therefore, the second rotating element is stopped from rotating, the drive force that is input from the electric motor via the first rotating element is changed in torque, and then is output to the third rotating element. Thus, even when the hydraulic pressure is not supplied, the drive force from the electric motor can be amplified in torque, and the thus-amplified drive force can be output from the third rotating element. Therefore, the driving force that needs to be produced by the electric motor can be reduced, so that size increase of the electric motor can be prevented. Besides, during the motor-driven travel, the brake is engaged without generation of hydraulic pressure. Therefore, there is no need to provide an electric oil pump or the like, so that size increase of the apparatus can be avoided.

Furthermore, during the motor-driven travel, since there is no need to operate the hydraulic pressure generation mechanism, the engine can be stopped, so that the fuel economy can be improved.

In the foregoing vehicle hybrid driving apparatus, the planetary gear ratio shift device may amplify drive torque that is input from the electric motor to the first rotating element, and may output amplified drive torque from the third rotating element.

According to this vehicle hybrid driving apparatus, the drive torque that needs to be produced by the electric motor can be lessened, so that size increase of the electric motor can be restrained.

In the vehicle hybrid driving apparatus of the invention, a sun gear of the planetary gear ratio shift device may correspond to the first rotating element, and a carrier of the ratio shift device may correspond to the second rotating element, and a ring gear of the ratio shift device may correspond to the third rotating element.

According to the foregoing vehicle hybrid driving apparatus, the drive torque that needs to be produced by the electric motor can be lessened, so that size increase of the electric motor can be restrained.

In the foregoing vehicle hybrid driving apparatus, the clutch may interrupt connection between the engine and the first rotating element when the hydraulic pressure is not supplied.

According to this vehicle hybrid driving apparatus, for example, during the regeneration control by the electric motor, the regeneration loss caused by the engine friction can be eliminated, and therefore the regeneration efficiency can be improved.

In the foregoing vehicle hybrid driving apparatus, the planetary gear ratio shift device, the electric motor, the clutch, and the brake may function as portions of an automatic transmission that is able to shift gear ratio in a plurality of speed change steps.

According to this vehicle hybrid driving apparatus, the increase in the number of component parts can be restrained, and therefore size increase of the apparatus can be restrained.

In the foregoing vehicle hybrid driving apparatus, the automatic transmission may include: a first gear ratio shift portion that includes a first planetary gear device of a double-pinion that has a first sun gear, a pair of first pinions that mesh with each other, a first carrier that supports the first pinions so that the first pinions are rotatable about axes of the first pinions and revolvable about a common axis, and a first ring gear that meshes with the first sun gear with the pair of first pinions; and a second gear ratio shift portion which includes a second planetary gear device of a single-pinion that has a second sun gear, a second pinion, a second carrier that supports the second pinion so that the second pinion is rotatable and revolvable, and a second ring gear that meshes with the second sun gear via the second pinion, and which also includes a third planetary gear device of a double-pinion that has a third sun gear, a pair of third pinions that mutually mesh with each other, a third carrier that supports the third pinions so that the third pinions are rotatable and revolvable, and a third ring gear that meshes with the third sun gear via the pair of third pinions. The second gear ratio shift portion may be constructed as a Ravigneaux gear train in which the second carrier of the second planetary gear device and the third carrier of the third planetary gear device are integrated to form a common carrier, and the second ring gear of the second planetary gear device and the third ring gear of the third planetary gear device are integrated to form a common ring gear, and the second pinion and one of the pair of third pinions form a common pinion. The first sun gear may be always linked to the stationary member, and the first carrier may be linked to the engine so that power transmission between the first carrier and the engine is possible, and rotation of the first ring gear may be reduced in speed relative to rotation of the first carrier. The second sun gear may be selectively linked to the first carrier via a fourth clutch, and may be selectively linked to the first ring gear via a third clutch, and may be selectively linked to the stationary member via a first brake, and the third sun gear may be selectively linked to the first ring gear via a first clutch, and the common carrier may be linked to the engine via a second clutch so that power transmission between the common carrier and the engine is possible, and the common carrier may be selectively linked to the stationary member via a second brake, and the common ring gear may be linked to the output shaft. The electric motor may be linked to the second sun gear so that power transmission between the electric motor and the second sun gear is possible. The first rotating element may correspond to the second sun gear, and the second rotating element may correspond to the common carrier, and the third rotating element may correspond to the common ring gear, and at least one of the first to fourth clutches may correspond to the clutch, and the second brake may correspond to the brake.

According to this vehicle hybrid driving apparatus, a hybrid construction can be provided by utilizing component parts of an automatic transmission, and therefore size increase of the apparatus can be restrained.

Besides, in the foregoing vehicle hybrid driving apparatus, the automatic transmission may include: a first gear ratio shift portion that includes a first planetary gear device of a single-pinion that has a first sun gear, a first pinion, a first carrier that supports the first pinion so that the first pinion is rotatable and revolvable, and a first ring gear that meshes with the first sun gear via the first pinion; and a second gear ratio shift portion which includes a second planetary gear device of a single-pinion that has a second sun gear, a second pinion, a second carrier that supports the second pinion so that the second pinion is rotatable and revolvable, and a second ring gear that meshes with the second sun gear via the second pinion, and which also includes a third planetary gear device of a double-pinion that has a third sun gear, a pair of third pinions, a third carrier that supports the third pinions so that the third pinions are rotatable and revolvable, and a third ring gear that meshes with the third sun gear via the pair of third pinions. The second gear ratio shift portion may be constructed as a Ravigneaux gear train in which the second carrier of the second planetary gear device and the third carrier of the third planetary gear device are integrated to form a common carrier, and the second ring gear of the second planetary gear device and the third ring gear of the third planetary gear device are integrated to form a common ring gear, and the second pinion and one of the pair of third pinions form a common pinion.

The first sun gear may be always linked to the stationary member, and the first ring gear may be linked to the engine so that power transmission between the first ring gear and the engine is possible, and rotation of the first carrier may be reduced in speed relative to rotation of the first ring gear. The second sun gear may be selectively linked to the first carrier via a third clutch, and may be selectively linked to the stationary member via a first brake, and the third sun gear may be selectively linked to the first carrier via a first clutch, and the common carrier may be linked to the engine via a second clutch so that power transmission between the common carrier and the engine is possible, and the common carrier may be selectively linked to the stationary member via a second brake, and the common ring gear may be linked to the output shaft. The electric motor may be linked to the second sun gear so that power transmission between the electric motor and the second sun gear is possible. The first rotating element may correspond to the second sun gear, and the second rotating element may correspond to the common carrier, and the third rotating element may correspond to the common ring gear, and at least one of the first to third clutches may correspond to the clutch, and the second brake may correspond to the brake.

According to this vehicle hybrid driving apparatus, a hybrid construction can be provided by utilizing component parts of an automatic transmission, and therefore size increase of the apparatus can be restrained.

The brake may connect the second rotating element and the stationary member by elastic force of an elastic member when the hydraulic pressure is not supplied.

Preferably, the foregoing electric motor is constructed so as to be able to drive the vehicle and also carry out regeneration. With such a construction, for example, during engine braking, electric power can be generated by rotationally driving the electric motor by the reverse drive force from the driving wheels. In this manner, fuel economy can be improved. During this operation, if the foregoing clutch is released, the regeneration loss caused by the friction torque of the engine can be eliminated, and therefore the amount of regeneration can be increased.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein:

FIG. 5 is an operation table (engagement operation table) illustrating the engagement states of engagement elements for establishing speed change steps in the vehicle hybrid driving apparatus shown in FIG. 4;

DETAILED DESCRIPTION OF EMBODIMENTS

Hereinafter, embodiments of the invention will be described in detail with reference to the drawings. In conjunction with the following description of embodiments, the drawings are appropriately simplified, or modified, and the dimension ratios of various portions, the shapes thereof, etc., are not necessarily accurately depicted.

Figure 1:
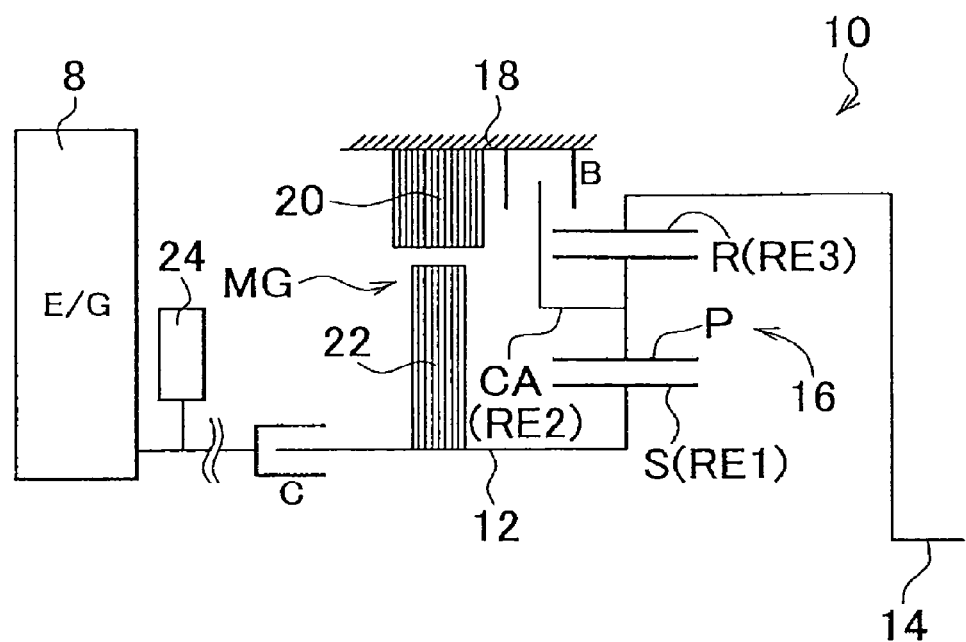
FIG. 1 is a skeleton diagram illustrating a basic construction that is a portion of a vehicle hybrid driving apparatus in accordance with a first embodiment of the invention.

FIG. 1 is a skeleton diagram illustrating a basic construction that is a portion of a vehicle hybrid driving apparatus 10 in accordance with a first embodiment of the invention. In FIG. 1, the vehicle hybrid driving apparatus 10 is constructed mainly of an input shaft 12, an electric motor MG that is linked to the input shaft 12 so that power transmission therebetween is possible, an output shaft 14 that is linked to driving wheels via a final speed reducer (not shown) or the like so that power can be transmitted to the driving wheels, and a planetary gear device 16 disposed between the input shaft 12 and the output shaft 14. The input shaft 12 is linked to an engine 8 via a clutch C so that power transmission therebetween is possible, and is also linked to the electric motor MG so that power transmission therebetween is possible. Thus, the vehicle hybrid driving apparatus 10 is able to selectively use the engine 8 and the electric motor MG as a drive power source. Incidentally, the engine 8 is made of an internal combustion engine, such as a gasoline engine, a diesel engine, etc., and power of the engine 8 is usually output to the input shaft 12 via a fluid transmission device such as a torque converter or the like.

The electric motor MG is a motor-generator that has both a driving function and a regeneration function. The electric motor MG includes a stator 20 fixed to a stationary member 18, and a rotor 22 that is rotated integrally with the input shaft 12.

The planetary gear device 16 is a single-pinion type planetary gear device that includes a sun gear S, pinions P, a carrier CA that supports the pinions P rotatably about their own axes and revolvably about a common axis, and a ring gear R that meshes with the sun gear S via the pinions P. The planetary gear device 16 is constructed of three rotating elements. In this embodiment, the sun gear S is defined as a first rotating element RE1, and the carrier CA is defined as a second rotating element RE2, and the ring gear R is defined as a third rotating element RE3.

In the planetary gear device 16, the sun gear S, which is the first rotating element RE1, is linked to the electric motor MG so that power transmission therebetween is possible, and is also linked to the engine 8 via the clutch C so that power transmission therebetween is possible. The carrier CA, which is the second rotating element RE2, is selectively linked to the stationary member, 18 via a brake B. The ring gear R, which is the third rotating element RE3, is linked to the output shaft 14. Due to this construction, when the brake B is engaged, the carrier CA is linked to the stationary member 18, and is therefore stopped from rotating, so that the rotation of the ring gear R is reduced in speed compared with the rotation of the sun gear S. On the other hand, if the brake B is released so that the carrier CA is rotatable, the planetary gear device 16 freely rotates.

The clutch C and the brake B are each made up of, for example, a hydraulic type friction engagement device of a multiplate type, a single-plate type, a belt type, etc. which is frictionally engaged by hydraulic pressure. Through the control of the hydraulic pressure, the engagement state of each of the clutch C and the brake B is controlled. It is to be noted herein that the foregoing hydraulic pressure is provided by using as a basic pressure the hydraulic pressure that is generated by a mechanical oil pump 24 that is operated by the driving of the engine 8. Therefore, when the engine 8 is in a stopped state, the oil pump 24 is also in a stopped state (no hydraulic pressure supplied), so that hydraulic pressure is not supplied to the clutch C or the brake B.

In this embodiment, the clutch C is constructed so as to engage when supplied with hydraulic pressure. When the engine 8 is stopped, that is, when the oil pump 24 is stopped, the supply of hydraulic pressure becomes impossible, so that the clutch C is released. Therefore, during stop of the engine (stop of the oil pump), the power transmission path between the engine 8 and the input shaft 12 or the first rotating element RE1 (sun gear S) are interrupted. On the other hand, the brake B is constructed so as to be released when supplied with hydraulic pressure. During a state where hydraulic pressure is not supplied, that is, during the time of no supply of hydraulic pressure resulting from the stop of the oil pump, the carrier CA and the stationary member 18 are connected (engaged). The brake B, during the state where hydraulic pressure is not supplied, connects the stationary member 18 and the carrier CA as the friction plates of the stationary member 18 and of the carrier CA which are disposed facing each other are pressed against each other by elastic force of a member 25 that has elasticity, for example, elastic force of springs. Then, when a hydraulic actuator of the brake B is supplied with hydraulic pressure, the brake B is released by causing the force from the hydraulic pressure to act in such a direction as to cancel out the pressing force of the springs. Therefore, when the hydraulic pressure is generated, the stationary member 18 and the carrier CA become rotatable relative to each other.

In the vehicle hybrid driving apparatus 10 constructed as described above, when the engine 8 is driven, the oil pump 24 is operated, so that it becomes possible to supply hydraulic pressure to the clutch C and the brake B. Then, when the clutch C is supplied with hydraulic pressure, power of the engine 8 is amplified in torque via the planetary gear device 16, before being transmitted to the output shaft 14. At this time, the planetary gear device 16 can be put into a power transmission-capable state by stopping the supply of hydraulic pressure to the brake B.

During the motor-driven travel by the electric motor MG since the engine 8 is stopped, the oil pump 24 is also stopped, so that the hydraulic pressure supply to the clutch C and the brake B is impossible (no supply of hydraulic pressure). Therefore, due to the time of no supply of hydraulic pressure, the clutch C is released, and therefore the power transmission path between the engine 8 and the first rotating element RE1 is interrupted. Besides, during the time of no supply of hydraulic pressure, the brake B connects the second rotating element RE2 and the stationary member 18, so that the second rotating element RE2 (carrier CA) is stopped from rotating. Therefore, when due to the driving of the electric motor MG drive torque is input to the first rotating element RE1 (sun gear S), the second rotating element RE2 (carrier CA) is stopped from rotating, so that torque is amplified and then output to the output shaft 14 via the third rotating element (ring gear R). Thus, torque is amplified before being output to the third rotating element RE3, even if the torque that the electric motor MG is able to output is small. Therefore, an electric motor MG able to output only small torque can also be selected or adopted. Since the maximum torque output of the electric motor MG and the size of the electric motor MG are proportional to each other, it becomes possible to select a compact-size electric motor MG.

Figure 2:
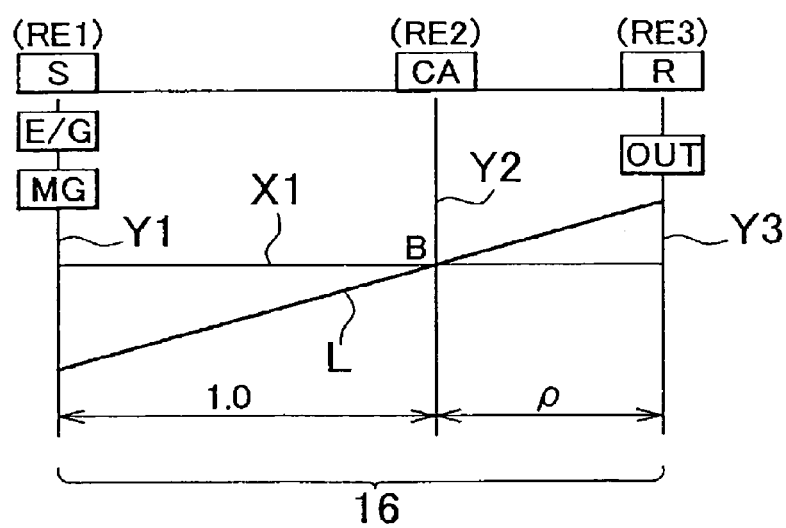
FIG. 2 is an alignment chart in which relative relations between the rotation speeds of rotating elements of a planetary gear device during a travel driven by an electric motor in the vehicle hybrid driving apparatus shown in FIG. 1 can be represented by straight lines.

FIG. 2 is an alignment chart in which relative relations between the rotation speeds of the rotating elements of the planetary gear device 16 during the motor-driven travel based on the electric motor MG in the vehicle hybrid driving apparatus 10 can be represented by straight lines. In FIG. 2, the chart is a two-dimensional coordinate system made up of a horizontal axis showing a relation among the gear ratios ρ of the planetary gear device 16, and vertical lines showing the relative rotation speeds. In the chart, a horizontal line X1 shows a rotation speed of zero. Besides, as for three vertical lines Y1, Y2 and Y3 corresponding to the three rotating elements that constitute the planetary gear device 16, the vertical line Y1, which is on the extreme left, shows the relative rotation speed of the sun gear S corresponding to the first rotating element RE1, and the vertical line Y2 shows the relative rotation speed of the carrier CA corresponding to the second rotating element RE2, and the vertical line Y3 shows the relative rotation speed of the ring gear R corresponding to the third rotation element RE3. The intervals between these lines are determined according to the gear ratios ρ of the planetary gear device 16. In the relation on the horizontal axis in the alignment chart, if it is assumed that the interval between the sun gear S and the carrier CA corresponds to "1", the interval between the carrier CA and the ring gear R corresponds to the gear ratio ρ of the planetary gear device 16. That is, with regard to the planetary gear device 16, the interval between the vertical lines Y1 and Y2 is set to an interval that corresponds to "1", and the interval between the vertical lines Y2 and Y3 is set to an interval that corresponds to the gear ratio ρ.

Referring to the alignment chart of FIG. 2, in the planetary gear device 16, the first rotating element RE1 (sun gear S) is linked to the electric motor MG and to the engine 8 (via the clutch C), and the second rotating element RE2 (carrier CA) is linked to the stationary member 18 via the brake B, and the third rotating element RE3 (ring gear R) is linked to the output shaft 14. During the motor-driven travel by the electric motor MG, since the engine 8 is stopped, the state of no supply of hydraulic pressure results, so that the brake B is engaged. Therefore, the second rotating element RE2 is linked to the stationary member 18, and therefore is stopped from rotating. The relation between the rotation speeds of the sun gear S and the ring gear R of the planetary gear device 16 during this state is shown by an oblique line L that passes through the intersection point of the lines Y2 and X1. Concretely, the intersection point of the vertical line Y1 and the straight line L shows the rotation speed of the first rotating element RE1, and the intersection point of the vertical line Y1 and the straight line L shows the rotation speed of the third rotating element RE3.

As shown in FIG. 2, when the electric motor MG rotates the first rotating element RE1 in a reverse direction, the rotation of the third rotating element RE3 is reduced in speed relative to the rotation of the first rotating element RE1, and the third rotation element RE3 is rotated in the forward direction. In other words, the drive torque input to the first rotating element RE1 is amplified, and then is output to the third rotating element RE3. Incidentally, the torque amplification rate is determined on the basis of the gear ratio ρ (ρ<1.0) of the planetary gear device 16.

Besides, in the case where the electric motor MG is rotated and driven for regeneration by the power (reverse drive torque) transmitted from the output shaft 14 side (driving wheel side), for example, during engine brake, or the like, the engine 8 is stopped, so that the oil pump 24 is not operated. In this case, therefore the clutch C is released, so that the link between the engine 8 and the input shaft 12 or the sun gear S is interrupted. On the other hand, the carrier CA is stopped from rotating during this state, since the brake B is engaged when hydraulic pressure is not supplied. Therefore, the power input from the input shaft 14 side (driving wheel side) rotationally drives the sun gear S and the electric motor MG, and thus the regeneration by the electric motor MG can be carried out. Besides, as the clutch C is released, the link between the engine 8 and the input shaft 12 is interrupted, so that the regeneration loss caused by the friction torque (friction force) of the engine 8 disappears and thus the amount of the regeneration by the electric motor MG increases. Incidentally, the friction torque of the engine 8 is torque that occurs due to the rotational resistance or the like that is caused by the friction between the cylinders and the pistons of the engine. When the engine 8 and the input shaft 12 are linked at the time of regeneration, the regeneration loss caused by the friction torque becomes large, and the amount of regeneration decreases.

As stated above, according to the embodiment, during the engine-driven travel, the clutch C is engaged, so that the engine 8 and the first rotating element RE1 are connected, and drive force of the engine 8 is output from the third rotating element RE3. On the other hand, during the motor-driven travel, the engine 8 is stopped and therefore the oil pump 24 does not operate, resulting in the state of no supply of hydraulic pressure, while the brake B connects the second rotating element RE2 and the stationary member 18 during the time of no supply of hydraulic pressure. Therefore, since the second rotating element RE2 is stopped from rotating, the drive force from the electric motor MG that is input from the first rotating element RE1 is amplified in torque, and then is output to the third rotating element RE3. Thus, even when hydraulic pressure is not supplied, it is possible to amplify the drive force from the electric motor MG, and output the amplified drive force from the third rotating element RE3. Therefore, the required drive force of the electric motor MG can be lessened, so that size increase of the electric motor MG can be prevented. Besides, during the motor-driven travel, the brake B is engaged due to no generation of hydraulic pressure. Therefore, the need to provide an electric oil pump or the like is eliminated, and thus size increase of the apparatus is avoided. Furthermore, during the motor-driven travel, there is no need to operate the oil pump 24, and therefore the engine 8 can be stopped. Therefore, the fuel economy can be improved.

Besides, according to the embodiment, the planetary gear device 16 amplifies the drive torque that is input to the first rotating element RE1 from the electric motor MG, and then outputs the amplified torque to the third rotating element RE3. Therefore, the drive torque from the electric motor MG may be small, and size increase of the electric motor MG can be substantially avoided.

Besides, according to the embodiment, the sun gear S of the planetary gear device 16 corresponds to the first rotating element RE1, and the carrier CA corresponds to the second rotating element RE2, and the ring gear R corresponds to the third rotating element RE3. This means that the drive torque that is input to the first rotating element RE1 from the electric motor MG is amplified, and then the amplified torque is output to the third rotating element RE3. Therefore, the required drive torque of the electric motor MG can be lessened, and therefore size increase of the electric motor MG can be restrained.

Besides, according to the embodiment, when hydraulic pressure is not supplied, the clutch C interrupts the connection between the engine 8 and the first rotating element RE1, so that the power transmission path between the engine 8 and the input shaft 14 is interrupted. Therefore, for example, at the time of the regeneration control by the electric motor MG, the regeneration loss caused by the engine friction of the engine 8 can be eliminated, and the regeneration efficiency can be improved.

Other embodiments of the invention will be described. In the embodiments described below, portions thereof that are the same or comparable to those in the foregoing embodiment are denoted by the same reference characters, and are omitted from the description below.

Figure 3:
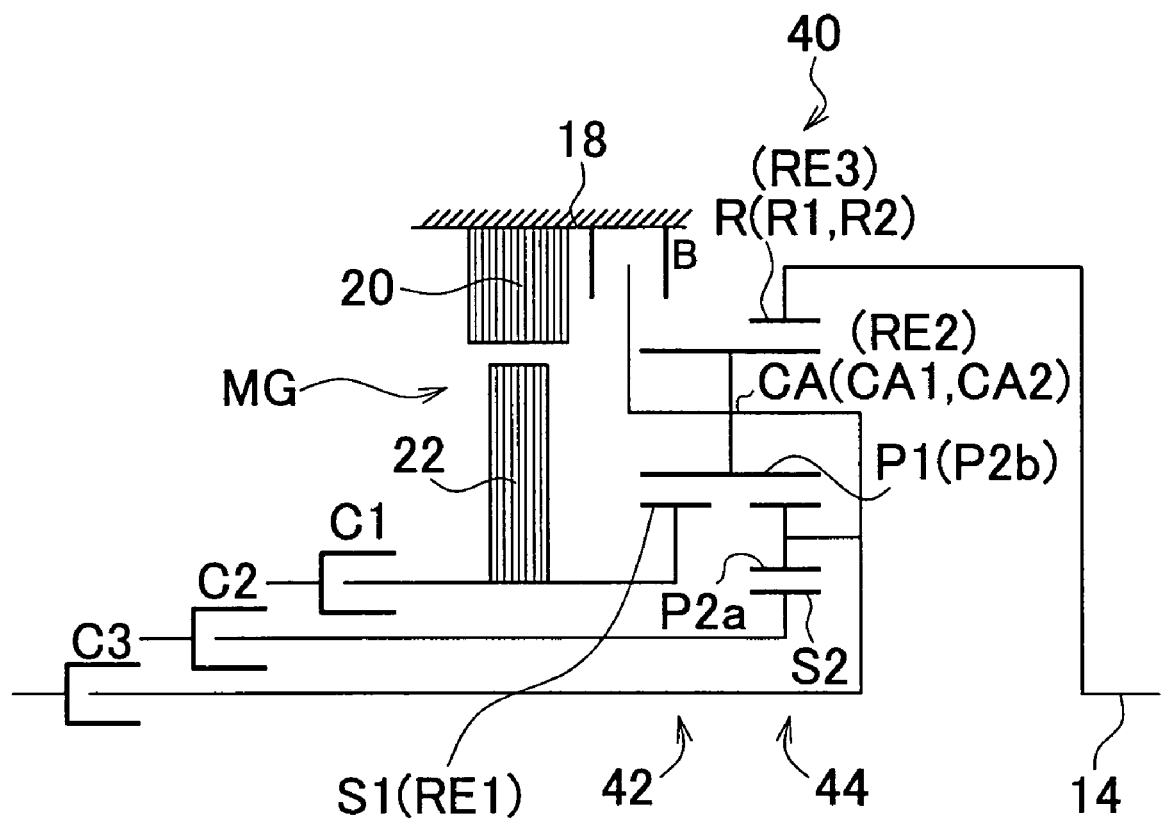
FIG. 3 is a skeleton diagram of a vehicle hybrid driving apparatus in accordance with a second embodiment of the invention.

FIG. 3 is a skeleton diagram of a vehicle hybrid driving apparatus 40 in accordance with a second embodiment of the invention, showing an example of a construction in which the foregoing vehicle hybrid driving apparatus 10 is combined with an automatic transmission capable of shifting to a plurality of speed change steps, or the like. The vehicle hybrid driving apparatus 40 shown in FIG. 3 has a first planetary gear device 42, and a second planetary gear device 44.

The first planetary gear device 42 is a single-pinion type planetary gear device that includes a first sun gear S1, first pinions P1, a first carrier CA1 that supports the first pinions P1 so that the first pinions P1 are rotatable about their own axes and revolvable about a common axis, and a first ring gear R1 that meshes with the first sun gear S1 via the first pinions P1. Besides, the second planetary gear device 44 is a double-pinion type planetary gear device that includes a second sun gear S2, two sets of second pinions P2 (P2a, P2b) that mutually mesh with each other, a second carrier CA2 that supports the second pinions P2 so that the second pinions P2 are rotatable and revolvable, and a second ring gear R2 that meshes with the second sun gear S2 via the second pinions P2.

It is to be noted herein that the first carrier CA1 of the first planetary gear device 42 and the second carrier CA2 of the second planetary gear device 44 are constructed of the same member (i.e., a common member), and the first ring gear R1 of the first planetary gear device 42, and the ring gear R2 of the second planetary gear device 44 are constructed of the same member (i.e., a common member). Then, the first pinions P1 of the first planetary gear device 42, and one of the two sets of the second pinions P2 (the set P2b in this example) are constructed of the same members (i.e., common members). Thus, a so-called Ravigneaux gear train is constructed. The common carrier CA (CA1, CA2) constructed of the first carrier CA1 and the second carrier CA2 is selectively linked to the stationary member 18 via the brake B, and is also linked to the engine 8 (not shown) via a third clutch C3 so that power transmission therebetween is possible, and the common ring gear R (R1, R2) constructed of the first ring gear R1 and the second ring gear R2 is linked to an output shaft 14.

Besides, the first sun gear S1 of the first planetary gear device 42 is linked to the engine 8 (not shown) via a clutch C1 so that power transmission therebetween is possible, and is also linked to an electric motor MG so that power transmission therebetween is possible. The second sun gear S2 of the second planetary gear device 44 is linked to the engine 8 via a second clutch C2 so that power transmission therebetween is possible.

If it is defined that the first planetary gear device 42 is a planetary gear device, and that the first rotating element RE1 is the first sun gear S1, and that the second rotating element RE2 is the common carrier CA, and that the third rotating element RE3 is the common ring gear R, and that the first clutch C1 is the clutch C, then the vehicle hybrid driving apparatus 40 is considered to have substantially the same construction as the foregoing vehicle hybrid driving apparatus 10. That is, the vehicle hybrid driving apparatus 40 also achieves substantially the same effects as the foregoing vehicle hybrid driving apparatus 10.

As described above, according to the embodiment, the hybrid construction of this invention is not limited to a stand-alone or separate construction. For example, if the hybrid construction is combined with an automatic transmission or the like, the increase in the number of component parts is restrained, and therefore a compact-size vehicle hybrid driving apparatus 40 can be constructed.

Figure 4:
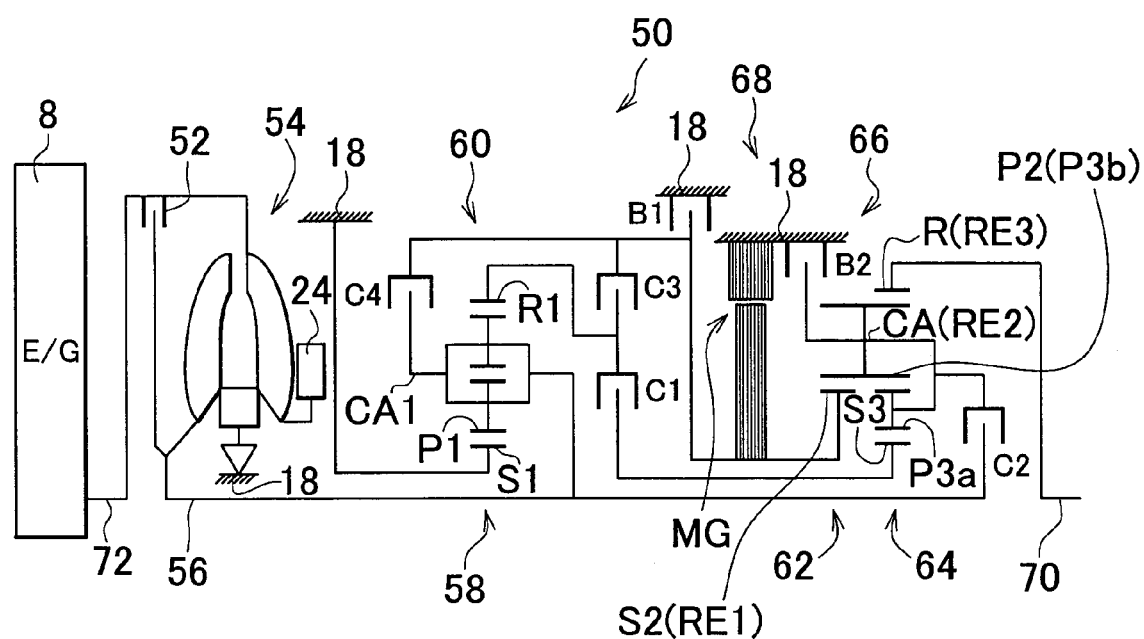
FIG. 4 is a skeleton diagram illustrating a vehicle hybrid driving apparatus in accordance with a third embodiment of the invention.

FIG. 4 is a skeleton diagram illustrating a vehicle hybrid driving apparatus 50 in accordance with a third embodiment of the invention, showing a concrete embodiment in which the vehicle hybrid driving apparatus 10, 40 is combined or incorporated as a portion of an automatic transmission. In FIG. 4, the vehicle hybrid driving apparatus 50 includes a transmission case 18 (hereinafter, termed the case 18) that is a stationary member that is attached to a vehicle body. In the case 18, an engine 8, a torque converter 54 that is equipped with a lockup clutch 52, and that is a fluid transmission device, an input shaft 56 linked to the torque converter 54, an automatic transmission 68 made up of a first gear ratio shift portion 60 constructed mainly of a first planetary gear device 58, and a second gear ratio shift portion 66 constructed mainly of a second planetary gear device 62 and a third planetary gear device 64, and an output shaft 70 are disposed sequentially on a common axis. This automatic transmission 68 can be suitably used as an FR-type automatic transmission that is mounted longitudinally in a vehicle, and is provided between the engine 8 and driving wheels (not shown). The foregoing input shaft 56 is a turbine shaft of the torque converter 54, to which drive force from the engine 8 which has been amplified in torque is input. Besides, the output shaft 70 transmits power, for example, to left and right driving wheels, via a final speed reducer (not shown).

The first planetary gear device 58 that constitutes the first gear ratio shift portion 60 is a double-pinion type planetary gear device, and includes a first sun gear S1, two sets of first pinions P1 that mutually mesh with each other, a first carrier CA1 that supports the first pinions P1 so that the first pinions P1 are rotatable about their own axes and revolvable about a common axis, and a first ring gear R1 that meshes with the first sun gear S1 via the first pinions P1. The first sun gear S1 is linked to the case 18, and thus is always stopped from rotating. The first carrier CA1 is linked to the input shaft 56, and is therefore rotated integrally with the input shaft 56. The first ring gear R1 functions as an intermediate output member that outputs rotation whose speed has been reduced relative to the rotation speed of the input shaft 56.

The second planetary gear device 62 and the third planetary gear device 64 that constitute the second gear ratio shift portion 66 are a single-pinion type planetary gear device, and a double-pinion type planetary gear device, respectively. The second planetary gear device 62 includes a second sun gear S2, second pinions P2, a second carrier CA2 that supports the second pinions P2 so that the second pinions P2 are rotatable and revolvable, and a second ring gear R2 that meshes with the second sun gear S2 via the second pinions P2. The third planetary gear device 64 includes a third sun gear S3, two sets of third pinions P3 (P3a, P3b) that mutually mesh with each other, a third carrier CA3 that supports the third pinions P3 so that the third pinions P3 are rotatable and revolvable, and a third ring gear R3 that meshes with the third sun gear S3 via the third pinions P3.

In the second gear ratio shift portion 66, the second carrier CA2 and the third carrier CA3 are integrated to form a common carrier CA that performs the functions of the second carrier CA2 and the third carrier CA3. Likewise, the second ring gear R2 and the third ring gear R3 are integrated to form a common ring gear R that performs the functions of the second ring gar R2 and the third ring gear R3. Furthermore, the second pinions P2, and one of the two sets of the third pinions P3 (the set P3b in this construction) that mesh with the second pinions P2 constitute common pinions. Thus, a so-called Ravigneaux type gear train is constructed.

The second sun gear S2 is selectively linked to the first carrier CA1, that is, the input shaft 56, via a fourth clutch C4, and is also selectively linked to the first carrier CA1 a the third clutch C3, and is selectively linked to the case 18 via a first brake B1. The third sun gear S3 is selectively linked to the first carrier CA1 via a first clutch C1. Besides, the common carrier CA formed by the second carrier CA2 and the third carrier CA3 is linked to the input shaft 56 via a second clutch C2, and is selectively linked to the case 18 via a second brake B2. Besides, the common ring gear R formed by the second ring gear R2 and the third ring gear R3 is linked to the output shaft 70. Furthermore, the second sun gear S2 is linked directly to an electric motor MG. Incidentally, the first to fourth clutches C1 to C4, the first brake B1, and the second brake B2 are each a hydraulic type friction engagement device of a multiplate type or the like that is friction-engaged by a hydraulic cylinder.

FIG. 5 is an operation table (engagement operation table) illustrating the engagement states of engagement elements for establishing speed change steps. In the table, "○" represents engagement, and blanks represent release. Incidentally, each the speed change steps is selected and established according to a command from an electronic control unit. Concretely, the first-speed gear step (1st) is established by engaging the first clutch C1 and the second brake B2, and the second-speed gear step (2nd) is established by engaging the first clutch C1 and the first brake B1. The third-speed gear step (3rd) is established by engaging the first clutch C1 and the third clutch C3, and the fourth-speed gear step (4th) is established by engaging the first clutch C1 and the fourth clutch C4. The fifth-speed gear step (5th) is established by engaging the first clutch C1 and the second clutch C2, and the sixth-speed gear step (6th) is established by engaging the second clutch C2 and the fourth clutch C4. The seventh-speed gear step (7th) is established by engaging the second clutch C2 and the third clutch C3, and the eighth-speed gear step (8th) is established by engaging the second clutch C2 and the first brake B1. Besides, the first reverse travel gear step (Rev1) is established by engaging the third clutch C3 and the second brake B2, and the second reverse travel gear step (Rev2) is established by engaging the fourth clutch C4 and the second brake B2. Besides, the "N" range and the "P" range in which the power transmission is interrupted are established when the first to fourth clutches C1 to C4, the first brake B1, and the second brake B2 are all released. Incidentally, when the "P" range is selected, the rotation of the output shaft 70 is mechanically fixed by, for example, a lock mechanism (not shown).

Besides, the vehicle hybrid driving apparatus 50 of this embodiment is constructed so that the motor-driven travel of the vehicle during which the electric motor MG is used as the drive power source can be achieved. For example, at the time of start or launch of the vehicle, or the time of low-load travel, the engine 8 can be stopped, and the vehicle can be caused to travel only by the electric motor MG. During this travel mode, a motor-driven travel (ECO) can be achieved by engaging the second brake B2. As the second brake B2 is engaged, the common carrier CA is stopped from rotating, so that the drive force that is input from the electric motor MG via the second sun gear S2 is amplified in torque, and the amplified drive force is output to the common ring gear R. Thus, the motor-driven travel by the electric motor MG is made possible.

During the motor-driven travel, the engine 8 is stopped, and therefore the oil pump 24 is stopped. Hence, during the motor-driven travel, hydraulic pressure cannot be generated. Therefore, it becomes impossible to supply hydraulic pressure to any one of the first to fourth clutches C1 to C4, the first brake B1 and the second brake B2. However, the second brake B2 is constructed so as to be engaged when no hydraulic pressure is supplied. Therefore, at the time of no supply of hydraulic pressure, the common carrier CA is connected to the case 18 by the second brake B2, and therefore is stopped from rotating. The second brake B2 is constructed so that, at the time of no supply of hydraulic pressure, the friction plates on the common carrier CA side and on the case 18 side which are disposed facing each other are pressed against each other by, for example, elastic force from a spring or the like, so that relative rotation therebetween becomes impossible. Then, when a hydraulic actuator (hydraulic cylinder) of the second brake B2 is supplied with hydraulic pressure, the Pressing force based on the hydraulic pressure is caused to act so as to cancel out the pressing force of the elastic member, whereby the friction plates of the common carrier CA and the case 18 are allowed to rotate relative to each other. Therefore, when hydraulic pressure is supplied, the connection between the common carrier CA and the case 18 is interrupted. Incidentally, the elastic member is set so as to generate a pressing force that is sufficiently strong to stop the common carrier CA from rotating, during the time of the travel based on the electric motor MG, or the time of the regeneration.

Since the second brake B2 is constructed as described above, the common carrier CA is connected to the case 18 to be stopped from rotating, when the engine 8 is stopped and therefore the oil pump 24 stops. Therefore, when the vehicle is caused to travel by the electric motor MG, the common carrier CA is stopped from rotating, so that the drive torque that is input from the electric motor MG to the second sun gear S2 is amplified in torque, and the amplified drive force is output to the common ring gear R. Besides, since the drive torque of the electric motor MG is amplified in torque, it becomes possible to use an electric motor MG whose maximum torque output is small, so that size increase of the electric motor MG is restrained.

Besides when drive force is input from the output shaft 70 side (reverse drive force), for example, during engine brake or the like, the regeneration control by the electric motor MG is carried out. During the regeneration, too, the engine 8 is stopped, so that the supply of hydraulic pressure becomes impossible. However, since the second brake B2 is engaged at the time of no supply of hydraulic pressure as described above, the common carrier CA is stopped from rotating. Therefore, the electric motor MG is rotated by the drive force input from the output shaft 70 side, whereby the regeneration is performed. At this time, due to the discontinuation of supply of hydraulic pressure, the first to fourth clutches C1 to C4 and the first brake B1 are automatically released. Due to this, the link between the engine 8 and the output shaft 70 is interrupted, so that the regeneration loss by the friction torque of the engine 8 is avoided. It is to be noted herein that, during the regeneration, if the engine 8 is linked to the output shaft 70 (driving wheels), the friction torque of the engine 8 acts in such a direction as to cancel out drive force input from the output shaft 70 side, so that the amount of the regeneration by the electric motor MG lessens.

As described above, the vehicle hybrid driving apparatus 50 also has substantially the same construction as the foregoing vehicle hybrid driving apparatus 10, in the automatic transmission 68, and therefore achieves substantially the same operation and effects. Concretely, if it is defined that in the vehicle hybrid driving apparatus 50, the second planetary gear device 62 is a planetary gear device, and the first rotating element RE1 is the second sun gear S2, and the second rotating element RE2 is the common carrier CA (CA2, CA3), and the third rotating element RE3 is the common ring gear R (R2, R3), and the first to fourth clutches C1 to C4 are a clutch C, and the second brake B2 is a brake B, then the vehicle hybrid driving apparatus 50 is considered to have substantially the same basic construction as the foregoing vehicle hybrid driving apparatus 10, and thus achieves substantially the same operation and effects as the vehicle hybrid driving apparatus 10.

Figure 6:
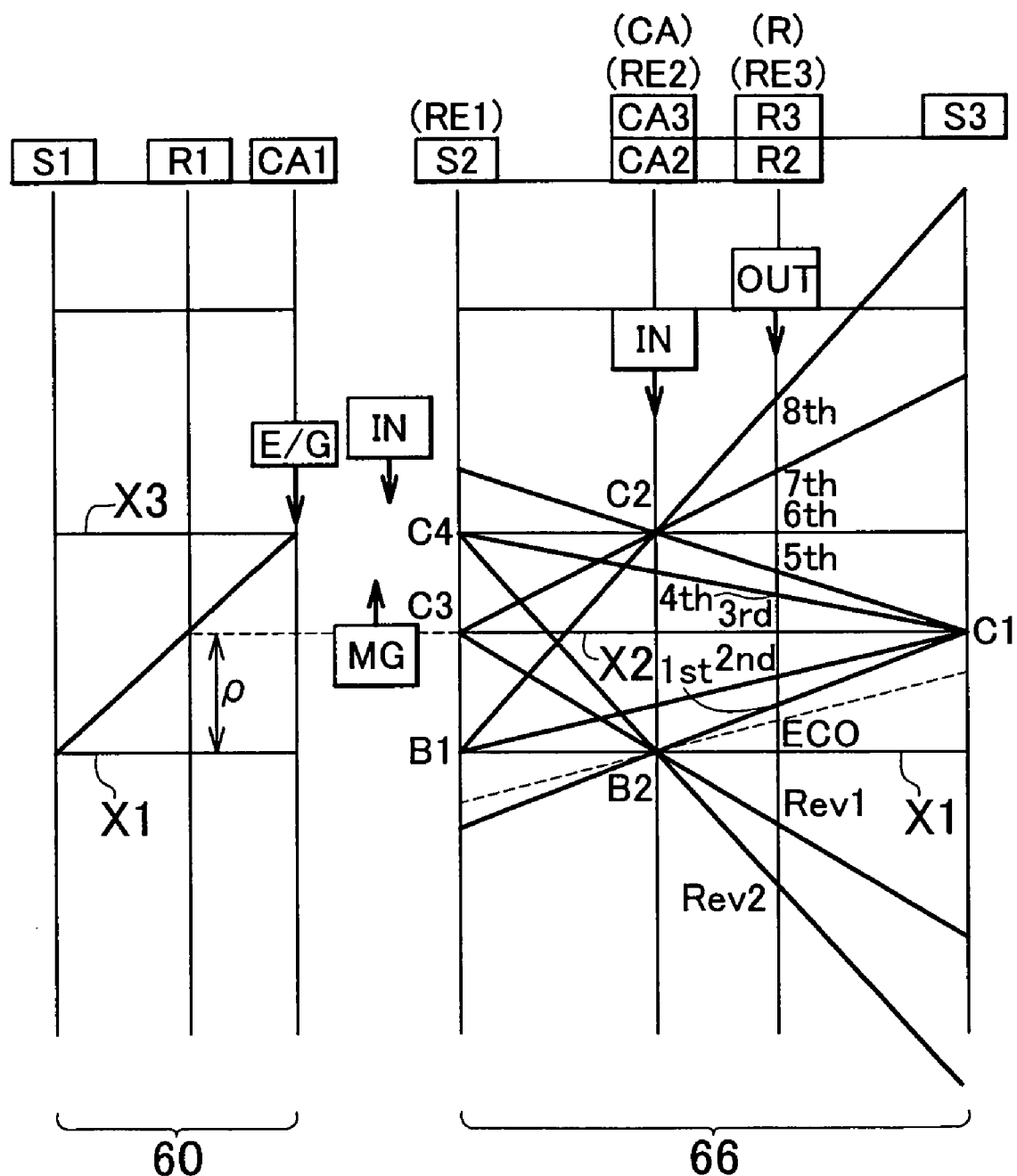
FIG. 6 is an alignment chart in which the rotation speeds of the rotating elements of a first gear ratio shift portion and a second gear ratio shift portion of the automatic transmission shown in FIG. 4 can be represented by straight lines.

FIG. 6 is an alignment chart in which the rotation speeds of the rotating elements of the first gear ratio shift portion 60 and the second gear ratio shift portion 66 of the automatic transmission 68 can be represented by straight lines. In FIG. 6, a horizontal line X1 represents a rotation speed of "0", and a horizontal line X2 represents the speed-reduced rotation speed that is output from the first ring gear R1, and a horizontal line X3 represents a rotation speed of "1.0", that is, the same rotation speed as that of the input shaft 56. Besides, vertical lines in the chart for the first gear ratio shift portion 60 represent the first sun gear S1, the first ring gear R1, and the first carrier CA1, in that order from the left side. Besides, four vertical lines in the chart for the second gear ratio shift portion 66 represent, sequentially from the left to the right, the second sun gear S2, the common carrier CA formed by the second carrier CA2 and the third carrier CA3, the common ring gear R formed by the second ring gear R2 and the third ring gear R3, and the third sun gear S3.

As shown in the alignment chart, when the second brake B2 is engaged to stop the common carrier CA from rotating, and the first clutch C1 is engaged, and therefore the rotation of the first ring gear R1 that has been reduced in speed relative to the rotation of the input shaft 56 by the first gear ratio shift portion 60 is input to the third sun gear S3, the common ring gear R linked to the output shaft 70 is rotated at a rotation speed that is shown by "1st" in the chart, which indicates the first-speed gear step, so that the largest speed change ratio (=the rotation speed of the input shaft 56/the rotation speed of the output shaft 70) is obtained.

When the first brake B1 is engaged to stop the second sun gear S2 from rotating, and the first clutch C1 is engaged to input the rotation of the first ring gear R1 to the third sun gear S3, the common ring gear R linked to the output shaft 70 is rotated at a rotation speed shown by "2nd", which indicates the second-speed gear step, so that a speed change ratio that is smaller than the speed change ratio of the first-speed gear step "1st" is obtained. With regard to the upshift from the first-speed gear step to the second-speed gear step, the gear shift response improves if the second sun gear S2 is quickly stopped from rotating by driving the electric motor MG in the forward direction.

When the first clutch C1 is engaged to input the rotation of the first ring gear R1 to the third sun gear S3, and the third clutch C3 is engaged to input the rotation of the first ring gear R1 to the second sun gear S2, the common ring gear R linked to the output shaft 70 is rotated at a rotation speed that is shown by "3rd", which indicates the third-speed gear step, so that a speed change ratio that is smaller than the speed change ratio of the second-speed gear step "2nd" is obtained. With regard to the upshift from the second-speed gear step to the third-speed gear step, the gear shift response improves if the rotation speed of the second sun gear S2 is quickly raised to the rotation speed of the first ring gear R1, which is the post-shift rotation speed, by driving the electric motor MG in the forward direction.

When the first clutch C1 is engaged to input the rotation of the first ring gear R1 to the third sun gear S3, and the fourth clutch C4 is engaged to input the rotation of the input shaft 56 to the second sun gear S2, the common ring gear R linked to the output shaft 70 is rotated at a rotation speed shown by "4*th*", which indicates the fourth-speed gear step, so that a speed change ratio that is smaller than the speed change ratio of the third-speed gear step "3rd" is obtained. With regard to the upshift from the third-speed gear step to the fourth-speed gear step, the gear shift response improves if the rotation speed of the second sun gear S2 is quickly raised to the rotation speed of the input shaft 56, which is the post-shift rotation speed, by driving the electric motor MG in the forward direction.

When the first clutch C1 is engaged to input the rotation of the first ring gear R1 to the third sun gear S3, and the second clutch C2 is engaged to input the rotation of the input shaft 56 to the common carrier CA, the common ring gear R linked to the output shaft 70 is rotated at a rotation speed shown by "5th", which indicates the fifth-speed gear step, so that a speed change ratio that is smaller than the speed change ratio of the fourth-speed gear step "4th" is obtained. With regard to the upshift from fourth-speed gear step to the fifth-speed gear step, the gear shift response improves if the rotation speed of the second sun gear S2 is quickly raised to a predetermined rotation speed that is set after the gear shift, by driving the electric motor MG in the forward direction.

When the second clutch C2 is engaged to input the rotation of the input shaft 56 to the common carrier CA, and the fourth clutch C4 is engaged to input the rotation of the input shaft 56 to the second sun gear S2, the common ring gear R linked to the output shaft 70 is rotated at a rotation speed that is shown by "6th", which indicates the sixth-speed gear step, so that a speed change ratio that is smaller than the speed change ratio of the fifth-speed gear step "5th" is obtained. With regard to the upshift from the fifth-speed gear step to the sixth-speed gear step, the gear shift response improves if the rotation speed of the second sun gear S2 is quickly lowered to the rotation speed of the input shaft 56, which is the post-shift rotation speed, by driving the electric motor MG in the reverse direction (or the reverse braking and reverse regeneration).

When the second clutch C2 is engaged to input the rotation of the input shaft 56 to the common carrier CA, and the third clutch C3 is engaged to input the rotation speed of the first ring gear R1 to the second sun gear S2, the common ring gear R linked to the output shaft 70 is rotated at a rotation speed that is shown by "7th", which indicates the seventh-speed gear step, so that a speed change ratio that is smaller than the speed change ratio of the sixth-speed gear step "6th" is obtained. With regard to the upshift from the sixth-speed gear step to the seventh-speed gear step, the gear shift response improves if the rotation speed of the second sun gear S2 is quickly lowered to the rotation speed of the first ring gear R1, which is the post-shift rotation speed, by driving the electric motor MG in the reverse direction (or the reverse braking and reverse regeneration).

When the second clutch C2 is engaged to input the rotation of the input shaft 56 to the common carrier CA, and the first brake B1 is engaged to stop the second sun gear S2 from rotating, the common ring gear R linked to the output shaft 70 is rotated at a rotation speed that is shown by "8th", which indicates the eighth-speed gear step, so that a speed change ratio that is smaller than the speed change ratio of the seventh-speed gear step "7th" is obtained. With regard to the upshift from the seventh-speed gear step to the eighth-speed gear step, the gear shift response improves if the rotation speed of the second sun gear S2 is quickly lowered to a rotation speed of zero that is set after the gear shift, by driving the electric motor MG in the reverse direction (or the reverse braking and reverse regeneration).

Besides, when the third clutch C3 is engaged to input the rotation of the first ring gear R1 to the second sun gear S2, and the second brake B2 is engaged to stop the common carrier CA from rotating, the common ring gear R linked to the output shaft 70 is rotated at a rotation speed that is shown by "Rev1", which indicates the reverse-travel first-speed gear step.

When the fourth clutch C4 is engaged to input the rotation of the input shaft 56 to the second sun gear S2, and the second brake B2 is engaged to stop the common carrier CA from rotating, the common ring gear R linked to the output shaft 70 is rotated at a rotation speed that is shown by "Rev2", which indicates the reverse-travel second-speed gear step.

Besides, during the motor-driven travel by the electric motor MG, if the second brake B2 is engaged to stop the common carrier CA from rotating, the common ring gear R linked to the output shaft 70 is rotated at a rotation speed that is reduced relative to the rotation speed of the electric motor MG as shown by "ECO" in the alignment chart of FIG. 6. In addition, the operation at the time of the regeneration is shown by substantially the same alignment chart as that of the motor-driven travel based on the electric motor MG that is, the regeneration is carried out as the drive force input from the common ring gear R rotates the electric motor MG. At this time, since the rotation of the electric motor MG is increased from the rotation of the output shaft 70, the electric motor MG can be subjected to the regeneration control at low torque and high rotation speed.

Besides, with regard to upshifts of the automatic transmission 68, the gear shift response can be improved by controlling the electric motor MG, as described above. Likewise, at the time of downshift, too, the gear shift response can be improved by suitably controlling the electric motor MG. For example, with regard to the downshift from the second-speed gear step to the first-speed gear step, the gear shift response improves if the rotation speed of the second sun gear S2 is quickly lowered to a predetermined post-shift rotation speed by driving the electric motor MG in the reverse direction. With regard to the downshift from the third-speed gear step to the second-speed gear step, the gear shift response improves if the rotation speed of the second sun gear S2 is quickly lowered to a post-shift rotation speed of zero by driving the electric motor MG in the reverse direction (or the reverse braking and reverse regeneration). With regard to the downshift from the fourth-speed gear step to the third-speed gear step, the gear shift response improves if the rotation speed of the second sun gear S2 is quickly lowered to the post-shift rotation speed of the first ring gear R1 by driving the electric motor MG in the reverse direction (or the reverse gracing and reverse regeneration). With regard to the downshift from the fifth-speed gear step to the fourth-speed gear step, the gear shift response improves if the rotation speed of the second sun gear S2 is quickly lowered to the rotation speed of the input shaft 56 by driving the electric motor MG in the reverse direction (or the reverse braking and reverse regeneration). With regard to the downshift from the sixth-speed gear step to the fifth-speed gear step, the gear shift response improves if the rotation speed of the second sun gear S2 is quickly raised to a predetermined rotation speed that is set after the gear shift, by driving the electric motor MG in the forward direction. With regard to the downshift from the seventh-speed gear step to the sixth-speed gear step, the gear shift response improves if the rotation speed of the second sun gear S2 is quickly raised to the rotation speed of the input shaft 56 by driving the electric motor MG in the forward direction. With regard to the downshift from the eighth-speed gear step to the seventh-speed gear step, the gear shift response improves if the rotation speed of the second sun gear S2 is quickly raised to the post-shift rotation speed of the first ring gear R1 by driving the electric motor MG in the forward direction.

As described above, according to the embodiment, the vehicle hybrid driving apparatus 50 is able to attain substantially the same effects as the foregoing vehicle hybrid driving apparatus 10, since the automatic transmission 68 of the vehicle hybrid driving apparatus 50 has substantially the same construction as the vehicle hybrid driving apparatus 10.

Besides, according to the embodiment, since the automatic transmission 68 is constructed as described above, a transmission of the forward-travel eight steps is achieved. In addition, since the foregoing vehicle hybrid construction is provided by utilizing a portion of the automatic transmission 68, substantially the same effects as those of the vehicle hybrid driving apparatus 10 are attained, and size increase of the vehicle hybrid driving apparatus 50 can be restrained.

Besides, according to the embodiment, at the time of gear shift of the automatic transmission 68, the gear shift response of the automatic transmission 68 can be improved by appropriately controlling the rotation speed of the second sun gear S2 through the use of the eclectic motor MG.

Figures 7, 8:
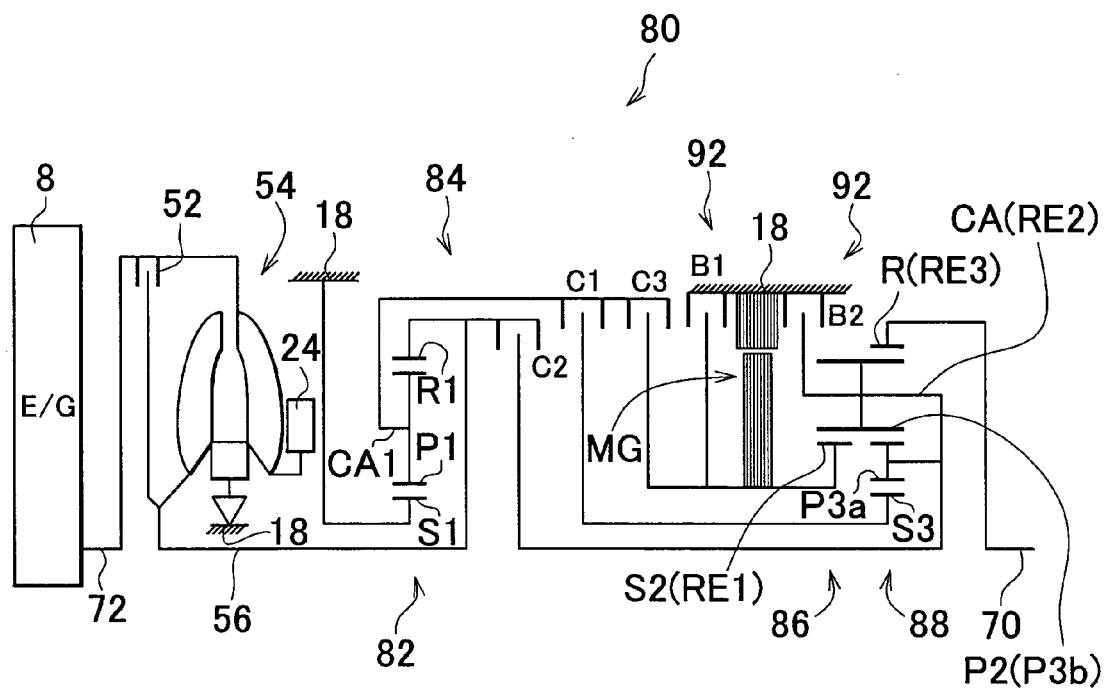
FIG. 7 is a skeleton diagram illustrating a vehicle hybrid driving apparatus in accordance with a fourth embodiment of the invention.
FIG. 8 is an operation table (engagement operation table) illustrating the engagement states of engagement elements for establishing speed change steps in the vehicle hybrid driving apparatus shown in FIG. 7.

FIG. 7 is a skeleton diagram illustrating a vehicle hybrid driving apparatus 80 in accordance with a fourth embodiment of the invention. The vehicle hybrid driving apparatus 80 is a concrete embodiment in which the foregoing vehicle hybrid driving apparatuses 10 and 40 are combined as a portion of an automatic transmission. In FIG. 7, the vehicle hybrid driving apparatus 80 includes a transmission case 18 (hereinafter, termed the case 18) that is a stationary member that is mounted in a vehicle body. In the case 18, the vehicle hybrid driving apparatus 80 has: an engine 8; a torque converter 54 equipped with a lockup clutch 52 which is provided as a fluid transmission device; an input shaft 56 linked to the torque converter 54; an automatic transmission 92 made up of a first gear ratio shift portion 84 that is constructed mainly of a first planetary gear device 82, and a second gear ratio shift portion 90 that is constructed mainly of a second planetary gear device 86 and a third planetary gear device 88; and an output shaft 70. These components are sequentially disposed on a common axis. This automatic transmission 92 is suitably used as an FR-type automatic transmission that is mounted longitudinally in a vehicle, and is provided between the engine 8 and driving wheels (not shown). The foregoing input shaft 56 is a turbine shaft of the torque converter 54, to which drive force from the engine 8 which has been amplified in torque is input. Besides, the output shaft 70 transmits power, for example, to left and right driving wheels, via a final speed reducer (not shown).

The first planetary gear device 82 that constitutes the first gear ratio shift portion 84 is a single-pinion type planetary gear device, and includes a first sun gear S1, first pinions P1, a first carrier CA1 that supports the first pinions P1 so that the first pinions P1 are rotatable about their own axes and revolvable about a common axis, and a first ring gear R1 that meshes with the first sun gear S1 via the first pinions P1. Besides, the first sun gear S1 is always linked to the case 18, and therefore is stopped from rotating. The first ring gear R1 is linked to the input shaft 56, and rotated integrally with the input shaft 56. The first carrier CA1 functions as an intermediate output member that outputs rotation whose speed is reduced relative to the rotation speed of the input shaft 56.

The second planetary gear device 86 and the third planetary gear device 88 that constitute the second gear ratio shift portion 90 are a single-pinion type planetary gear device, and a double-pinion type planetary gear device, respectively. The second planetary gear device 86 includes a second sun gear S2, second pinions P2, a second carrier CA2 that supports the second pinions P2 so that the second pinions P2 are rotatable and revolvable, and a second ring gear R2 that meshes with the second sun gear S2 via the second pinions P2. The third planetary gear device 88 includes a third sun gear S3, two sets of third pinions P3 (P3a, P3b) that mutually mesh with each other, a third carrier CA3 that supports the third pinions P3 so that the third pinions P3 are rotatable and revolvable, and a third ring gear R3 that meshes with the third sun gear S3 via the third pinions P3.

In the second gear ratio shift portion 90, the second carrier CA2 and the third carrier CA3 are integrated to form a common carrier CA that performs the functions of the second carrier CA2 and the third carrier CA3. Likewise, the second ring gear R2 and the third ring gear R3 are integrated to form a common ring gear R that performs the functions of the second ring gar R2 and the third ring gear R3. Furthermore, the second pinions P2, and one of the two sets of the third pinions P3 that mesh with the second pinions P2, that is, the set P3b, constitute common pinions. Thus, a so-called Ravigneaux type gear train is constructed.

The second sun gear S2 is selectively linked to the first carrier CA1 via a third clutch C3, and is also selectively linked to the case 18 via a first brake B1. The third sun gear S3 is selectively linked to the first carrier CA1 via a first clutch C1. Besides, the common carrier CA formed by the second carrier CA2 and the third carrier CA3 is linked to the input shaft 56 via a second clutch C2, and is selectively linked to the case 18 via a second brake B2. Besides, the common ring gear R formed by the second ring gear R2 and the third ring gear R3 is linked to the output shaft 70. Furthermore, the second sun gear S2 is linked to an electric motor MG so that power transmission therebetween is possible. Incidentally, the first to third clutches C1 to C3, the first brake B1, and the second brake B2 are each a hydraulic type friction engagement device of a multiplate type or the like that is friction-engaged by a hydraulic cylinder.

FIG. 8 is an operation table (engagement operation table) illustrating the engagement states of engagement elements for establishing speed change steps. In the table, "◯" represents engagement, and blanks represent release. Incidentally, each the speed change steps is selected and established according to a command from an electronic control unit. Concretely, the first-speed gear step (1st) is established by engaging the first clutch C1 and the second brake B2, and the second-speed gear step (2nd) is established by engaging the first clutch C1 and the first brake B1. The third-speed gear step (3rd) is established by the first clutch C1 and the third clutch C3, and the fourth-speed gear step (4th) is established by engaging the first clutch C1 and the second clutch C2. The fifth-speed gear step (5th) is established by engaging the second clutch C2 and the third clutch C3, and the sixth-speed gear step (6th) is established by engaging the second clutch C2 and the first brake B1. Besides, the reverse travel gear step (Rev) is established by engaging the third clutch C3 and the second brake B2. Besides, the "N" range and the "P" range in which the power transmission is interrupted are established when the first to third clutches C1 to C3, the first brake B1, and the second brake B2 are all released. Incidentally, when the "P" range is selected, the rotation of the output shaft 70 is mechanically fixed by, for example, a lock mechanism (not shown). Although not described in detail, the gear shift response of the automatic transmission 92 can be improved by controlling the electric motor MG in this embodiment as well.

Besides, the vehicle hybrid driving apparatus 80 of this embodiment is constructed so that the motor-driven travel of the vehicle during which the electric motor MG is used as the drive power source can be achieved. For example, at the time of start or launch of the vehicle, or the time of low-load travel, the engine 8 can be stopped, and the vehicle can be caused to travel only by the electric motor MG. During this travel mode, a motor-driven travel (ECO) can be achieved by engaging the second brake B2. As the second brake B2 is engaged, the common carrier CA is stopped from rotating, so that the drive force that is input from the electric motor MG via the second sun gear S2 is amplified in torque, and the amplified drive force is output to the common ring gear R.

During the motor-driven travel, the engine 8 is stopped, and therefore the oil pump 24 is stopped. Hence, during the motor-driven travel, hydraulic pressure cannot be generated. Therefore, it becomes impossible to supply hydraulic pressure to any one of the first to third clutches C1 to C3, the first brake B1 and the second brake B2. However, the second brake B2 is constructed so as to be engaged when hydraulic pressure is not supplied. Therefore, at the time of no supply of hydraulic pressure, the common carrier CA is connected to the case 18 by the second brake B2, and therefore is stopped from rotating. The second brake B2 is constructed so that, at the time of no supply of hydraulic pressure, the friction plates on the common carrier CA side and on the case 18 side which are disposed facing each other are pressed against each other by, for example, elastic force from a spring or the like, so that relative rotation therebetween becomes impossible. Then, when a hydraulic actuator (hydraulic cylinder) of the second brake B2 is supplied with hydraulic pressure, the pressing force based on the hydraulic pressure is caused to act so as to cancel out the pressing force of the elastic member, whereby the friction plates of the common carrier CA and the case 18 are allowed to rotate relative to each other. Therefore, when hydraulic pressure is supplied, the connection between the common carrier CA and the case 18 is interrupted. Incidentally, the elastic member is set so as to generate a pressing force that is sufficiently strong to stop the common carrier CA from rotating, during the time of the travel based on the electric motor MG, or the time of the regeneration.

Since the second brake B2 is constructed as described above, the common carrier CA is connected to the case 18 to be stopped from rotating when the engine 8 is stopped and therefore the oil pump 24 stops. Therefore, when the vehicle is caused to travel by the electric motor MG, the common carrier CA is stopped from rotating, so that the drive torque that is input from the electric motor MG to the second sun gear S2 is amplified in torque, and the amplified drive force is output to the common ring gear R. Besides, since the drive torque of the electric motor MG is amplified in torque, it becomes possible to use an electric motor MG whose maximum torque output is small, so that size increase of the electric motor MG is restrained.

Besides when drive force is input from the output shaft 70 side (reverse drive force), for example, during engine brake or the like, the regeneration control by the electric motor MG is carried out. During the regeneration, too, the engine 8 is stopped, so that the supply of hydraulic pressure becomes impossible. However, since the second brake B2 is engaged at the time of no supply of hydraulic pressure as described above, the common carrier CA is stopped from rotating. Therefore, the electric motor MG is rotated by the drive force input from the output shaft 70 side, whereby the regeneration is performed. At this time, due to the discontinuation of supply of hydraulic pressure, the first to third clutches C1 to C3 and the first brake B1 are automatically released. Due to this, the link between the engine 8 and the output shaft 70 is interrupted, so that the regeneration loss by the friction torque of the engine 8 is avoided. It is to be noted herein that, during the regeneration, if the engine 8 is linked to the output shaft 70 (driving wheels), the friction torque of the engine 8 acts in such a direction as to cancel out drive force input from the output shaft 70 side, so that the amount of the regeneration by the electric motor MG lessens.

As described above, the vehicle hybrid driving apparatus 80 also has substantially the same construction as the foregoing vehicle hybrid driving apparatus 10, in the automatic transmission 68, and therefore achieves substantially the same operation and effects. Concretely, if it is defined that in the vehicle hybrid driving apparatus 80, the second planetary gear device 86 is a planetary gear device, and the first rotating element RE1 is the second sun gear S2, and the second rotating element RE2 is the common carrier CA (CA2, CA3), and the third rotating element RE3 is the common ring gear R (R2, R3), and the first to third clutches C1 to C3 are a clutch C, and the second brake B2 is a brake B, then the vehicle hybrid driving apparatus 80 is considered to have substantially the same basic construction as the foregoing vehicle hybrid driving apparatus 10, and thus achieves substantially the same operation and effects as the vehicle hybrid driving apparatus 10.

As described above, according to the embodiment, the vehicle hybrid driving apparatus 80 is able to attain substantially the same effects as the foregoing, vehicle hybrid driving apparatus 10, since the automatic transmission 92 of the vehicle hybrid driving apparatus 80 has substantially the same construction as the vehicle hybrid driving apparatus 10.

Besides, according to the embodiment, since the automatic transmission 92 is constructed as described above, a transmission of the forward-travel six steps is achieved. In addition, since the foregoing hybrid construction is provided by utilizing a portion of the automatic transmission 92, substantially the same effects as those of the vehicle hybrid driving apparatus 10 are attained, and size increase of the vehicle hybrid driving apparatus 80 can be restrained.

While the embodiments of the invention have been described above with reference to the drawings, the invention is also applicable to other embodiments, constructions, etc.

For example, the automatic transmissions 68 and 92 in the foregoing embodiments are mere examples, and the invention can be freely applied to other automatic transmissions within a scope in which there is no contradiction.

Besides, in the foregoing embodiments, the sun gear S of the planetary gear device is linked to the electric motor MG so that power transmission therebetween is possible, and the carrier CA is selectively linked to the stationary member 18 via the brake B, and the ring gear R is linked to the output shaft 14. However, according to the invention, the foregoing embodiments are not restrictive, but an arbitrary link construction is possible as long as, during the time of no supply of hydraulic pressure, the brake B is engaged to stop a predetermined rotation element from rotating, and the torque of the electric motor MG is amplified and then is output. For example, the invention can also be applied to a construction of a double-pinion type planetary gear device in which the carrier is linked to the electric motor MG so that power transmission therebetween is possible, and the sun gear is linked to a stationary member 18 by a brake B at the time of no supply of hydraulic pressure, and the ring gear is linked to the output shaft 14.

Besides, although in the foregoing embodiments, the vehicle hybrid driving apparatuses 50 and 80 have hybrid mechanisms in the automatic transmissions 68 and 92, the location of the hybrid mechanism is not limited to the inside of the automatic transmission. For example, a hybrid mechanism may be provided independently of an automatic transmission.

Besides, although in the foregoing embodiments, the brake B is engaged on the basis of the pressing force, from a spring, it is also permissible to adopt a construction in which the pressing force is generated by a different method, for example, by utilizing elastic force of a rubber member or the like.

It is to be understood that what have been described above are mere embodiments, and the invention can be carried out in various manners with modifications, changes or the like that are made on the basis of the knowledge of a person having ordinary skill in the art.

While the invention has been described with reference to example embodiments thereof, it is to be understood that the invention is not limited to the described embodiments or constructions. On the other hand, the invention is intended to cover various modifications and equivalent arrangements. In addition, while the various elements of the disclosed invention are shown in various example combinations and configurations, other combinations and configurations, including more, less or only a single element, are also within the scope of the appended claims.

What is claimed is:

1. A vehicle hybrid driving apparatus that has an engine and an electric motor as drive power sources, comprising:
    a hydraulic pressure generation mechanism that generates hydraulic pressure by using drive force from the engine; and
    a planetary gear ratio shift device that has three rotating elements that are a first rotating element, a second rotating element, and a third rotating element, wherein:
    the first rotating element is linked to the electric motor so that power transmission between the first rotating element and the electric motor is possible, and is linked to the engine and the hydraulic pressure generation mechanism via a clutch so that power transmission between the first rotating element and the engine is possible, and the clutch is provided between the hydraulic pressure generation mechanism and the first rotating element;
    the second rotating element is selectively linked to a stationary member via a brake;
    the third rotating element is linked to an output shaft so that power transmission between the third rotating element and the output shaft is possible; and
    the brake connects the second rotating element and the stationary member when hydraulic pressure from the hydraulic pressure generation mechanism is not supplied to the brake.

2. The vehicle hybrid driving apparatus according to claim 1, wherein the planetary gear ratio shift device amplifies drive torque that is input from the electric motor to the first rotating element, and outputs amplified drive torque from the third rotating element.

3. The vehicle hybrid driving apparatus according to claim 1, wherein the clutch interrupts connection between the engine and the first rotating element when the hydraulic pressure is not supplied.

4. The vehicle hybrid driving apparatus according to claim 1, wherein the planetary gear ratio shift device, the electric motor, the clutch, and the brake function as portions of an automatic transmission that is able to shift gear ratio in a plurality of speed change steps.

5. The vehicle hybrid driving apparatus according to claim 4, wherein:
    the automatic transmission comprises
    a first gear ratio shift portion that includes a first planetary gear device of a double-pinion that has a first sun gear, a pair of first pinions that mesh with each other, a first carrier that supports the first pinions so that the first pinions are rotatable about axes of the first pinions and revolvable about a common axis, and a first ring gear that meshes with the first sun gear via the pair of first pinions, and
    a second gear ratio shift portion which includes a second planetary gear device of a single-pinion that has a second sun gear, a second pinion, a second carrier that supports the second pinion so that the second pinion is rotatable and revolvable, and a second ring gear that meshes with the second sun gear via the second pinion, and which also includes a third planetary gear device of a double-pinion that has a third sun gear, a pair of third pinions that mutually mesh with each other, a third carrier that supports the third pinions so that the third pinions are rotatable and revolvable, and a third ring gear that meshes with the third sun gear via the pair of third pinions;
    the second gear ratio shift portion is constructed as a Ravigneaux gear train in which the second carrier of the second planetary gear device and the third carrier of the third planetary gear device are integrated to form a common carrier, and the second ring gear of the second planetary gear device and the third ring gear of the third planetary gear device are integrated to form a common ring gear, and the second pinion and one of the pair of third pinions form a common pinion;
    the first sun gear is always linked to the stationary member, and the first carrier is linked to the engine so that power transmission between the first carrier and the engine is possible, and rotation of the first ring gear is reduced in speed relative to rotation of the first carrier;
    the second sun gear is selectively linked to the first carrier via a fourth clutch, and is selectively linked to the first ring gear via a third clutch, and is selectively linked to the stationary member via a first brake, and the third sun gear is selectively linked to the first ring gear via a first clutch, and the common carrier is linked to the engine via a second clutch so that power transmission between the common carrier and the engine is possible, and the common carrier is selectively linked to the stationary member via a second brake, and the common ring gear is linked to the output shaft;
    the electric motor is linked to the second sun gear so that power transmission between the electric motor and the second sun gear is possible; and
    the first rotating element corresponds to the second sun gear, and the second rotating element corresponds to the common carrier, and the third rotating element corresponds to the common ring gear, and at least one of the first to fourth clutches corresponds to the clutch, and the second brake corresponds to the brake.

6. The vehicle hybrid driving apparatus according to claim 1, wherein the brake connects the second rotating element and the stationary member by elastic force when the hydraulic pressure is not supplied.

7. A vehicle hybrid driving apparatus that has an engine and an electric motor as drive power sources, comprising:
   a hydraulic pressure generation mechanism that generates hydraulic pressure by using drive force from the engine; and
   a planetary gear ratio shift device that has three rotating elements that are a first rotating element, a second rotating element, and a third rotating element, wherein:
   the first rotating element is linked to the electric motor so that power transmission between the first rotating element and the electric motor is possible, and is linked to the engine via a clutch so that power transmission between the first rotating element and the engine is possible;
   the second rotating element is selectively linked to a stationary member via a brake;
   the third rotating element is linked to an output shaft so that power transmission between the third rotating element and the output shaft is possible;
   the brake connects the second rotating element and the stationary member when hydraulic pressure from the hydraulic pressure generation mechanism is not supplied; and
   a sun gear of the planetary gear ratio shift device corresponds to the first rotating element, and a carrier of the ratio shift device corresponds to the second rotating element, and a ring gear of the ratio shift device corresponds to the third rotating element.

8. A vehicle hybrid driving apparatus that has an engine and an electric motor as drive power sources, comprising:
   a hydraulic pressure generation mechanism that generates hydraulic pressure by using drive force from the engine; and
   a planetary gear ratio shift device that has three rotating elements that are a first rotating element, a second rotating element, and a third rotating element, wherein:
   the first rotating element is linked to the electric motor so that power transmission between the first rotating element and the electric motor is possible, and is linked to the engine via a clutch so that power transmission between the first rotating element and the engine is possible;
   the second rotating element is selectively linked to a stationary member via a brake;
   the third rotating element is linked to an output shaft so that power transmission between the third rotating element and the output shaft is possible;
   the brake connects the second rotating element and the stationary member when hydraulic pressure from the hydraulic pressure generation mechanism is not supplied;
   the planetary gear ratio shift device, the electric motor, the clutch, and the brake function as portions of an automatic transmission that is able to shift gear ratio in a plurality of speed change steps; and
   the automatic transmission comprises
      a first gear ratio shift portion that includes a first planetary gear device of a single-pinion that has a first sun gear, a first pinion, a first carrier that supports the first pinion so that the first pinion is rotatable and revolvable, and a first ring gear that meshes with the first sun gear via the first pinion, and
      a second gear ratio shift portion which includes a second planetary gear device of a single-pinion that has a second sun gear, a second pinion, a second carrier that supports the second pinion so that the second pinion is rotatable and revolvable, and a second ring gear that meshes with the second sun gear via the second pinion, and which also includes a third planetary gear device of a double-pinion that has a third sun gear, a pair of third pinions, a third carrier that supports the third pinions so that the third pinions are rotatable and revolvable, and a third ring gear that meshes with the third sun gear via the pair of third pinions;
   the second gear ratio shift portion is constructed as a Ravigneaux gear train in which the second carrier of the second planetary gear device and the third carrier of the third planetary gear device are integrated to form a common carrier, and the second ring gear of the second planetary gear device and the third ring gear of the third planetary gear device are integrated to form a common ring gear, and the second pinion and one of the pair of third pinions form a common pinion;
   the first sun gear is always linked to the stationary member, and the first ring gear is linked to the engine so that power transmission between the first ring gear and the engine is possible, and rotation of the first carrier is reduced in speed relative to rotation of the first ring gear;
   the second sun gear is selectively linked to the first carrier via a third clutch, and is selectively linked to the stationary member via a first brake, and the third sun gear is selectively linked to the first carrier via a first clutch, and the common carrier is linked to the engine via a second clutch so that power transmission between the common carrier and the engine is possible, and the common carrier is selectively linked to the stationary member via a second brake, and the common ring gear is linked to the output shaft; the electric motor is linked to the second sun gear so that power transmission between the electric motor and the second sun gear is possible; and
   the first rotating element corresponds to the second sun gear, and the second rotating element corresponds to the common carrier, and the third rotating element corresponds to the common ring gear, and at least one of the first to third clutches corresponds to the clutch, and the second brake corresponds to the brake.

* * * * *